(12) United States Patent
Wei et al.

(10) Patent No.: US 7,394,040 B2
(45) Date of Patent: Jul. 1, 2008

(54) ELECTROMACHINING PROCESS AND APPARATUS

(75) Inventors: Bin Wei, Mechanicville, NY (US); Michael Scott Lamphere, Hooksett, NH (US); Jeffrey Francis Wessels, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/395,912

(22) Filed: Mar. 31, 2006

(65) Prior Publication Data

US 2007/0228017 A1    Oct. 4, 2007

(51) Int. Cl.
    B23H 5/02    (2006.01)
(52) U.S. Cl. ............ 219/69.14; 205/640; 219/69.17
(58) Field of Classification Search ........... 219/69.14, 219/69.17, 69.2; 205/646, 651, 652
    See application file for complete search history.

(56) References Cited

U.S. PATENT DOCUMENTS

| | | | | |
|---|---|---|---|---|
| 3,352,770 A | * | 11/1967 | Crawford et al. ............ 205/654 |
| 3,357,906 A | * | 12/1967 | Jollis et al. ................ 205/654 |
| 3,594,299 A | * | 7/1971 | Inoue ..................... 204/224 M |
| 4,001,538 A | * | 1/1977 | Michalski ................. 219/69.17 |
| 4,134,807 A | * | 1/1979 | Briffod ................... 219/69.17 |
| 4,487,671 A | * | 12/1984 | McGeough .............. 219/69.17 |
| 4,596,066 A | * | 6/1986 | Inoue ....................... 219/69.17 |
| 4,628,170 A | * | 12/1986 | Furukawa ................ 219/69.14 |
| 4,628,171 A | * | 12/1986 | Colby et al. ............... 219/69.2 |
| 4,973,812 A |  | 11/1990 | Aramaki et al. .......... 219/69.12 |
| 4,992,639 A | * | 2/1991 | Watkins et al. ............. 219/69.2 |
| 5,867,550 A | * | 2/1999 | Beuerlein ................... 376/313 |
| 6,379,528 B1 | * | 4/2002 | Lee et al. ..................... 205/640 |
| 6,489,582 B1 |  | 12/2002 | Roedl et al. .............. 219/69.17 |
| 6,563,071 B2 |  | 5/2003 | Krenz ..................... 219/69.13 |
| 6,723,223 B2 | * | 4/2004 | Zaitsev et al. ............... 205/652 |
| 6,787,728 B2 |  | 9/2004 | Wei et al. ................. 219/69.15 |
| 7,041,933 B2 | * | 5/2006 | Forrester et al. ......... 219/69.17 |
| 2002/0170829 A1 | * | 11/2002 | Kim et al. .................... 205/640 |
| 2004/0124078 A1 | * | 7/2004 | Wei et al. .................... 205/646 |
| 2005/0082261 A1 |  | 4/2005 | Lee et al. ................. 219/69.11 |
| 2005/0098445 A1 |  | 5/2005 | Batzinger et al. ........... 205/644 |
| 2005/0133378 A1 | * | 6/2005 | Glock et al. ................ 205/651 |
| 2005/0218089 A1 |  | 10/2005 | Wei et al. .................... 210/805 |

FOREIGN PATENT DOCUMENTS

| | | | |
|---|---|---|---|
| JP | 2003-53629 A | * | 2/2003 |
| JP | 2005-224887 A | * | 8/2005 |

* cited by examiner

*Primary Examiner*—Geoffrey S Evans
(74) *Attorney, Agent, or Firm*—Penny A. Clarke

(57) ABSTRACT

An electromachining process and apparatus includes providing both high-speed electroerosion functions for rapidly rough finishing a workpiece and electrodischarge machining functions for fine finishing by first using a rotary electrode to implement the high-speed electroerosion function, and then removing and replacing the rotary electrode with an EDM electrode to implement the electrodischarge machining functions.

19 Claims, 2 Drawing Sheets

ELECTROMACHINING PROCESS AND APPARATUS

BACKGROUND

The present disclosure generally relates to electromachining apparatuses and processes, and more particularly, to an electromachining apparatus and process configured for providing both roughing and finishing operations.

A large amount of time is spent in machining different types of metal components for commercial and industrial usage. The amount of time is generally dependent on the material being machined and the machining method used. One method used frequently for complex components, particularly those with contours, is milling. This can take a substantial amount of the overall component processing time. For the most demanding applications, carbide cutters are typically utilized. Other methods include electrodischarge machining (EDM) which is widely used for machining complex parts and dies and molds.

EDM is a process in which an electrically conductive metal workpiece is shaped by removing material through melting or vaporization by electrical sparks and arcs. The spark discharge and transient arc are produced by applying controlled pulsed direct current between the workpiece (typically anodic or positively charged) and the tool or electrode (typically the cathode or negatively charged). The end of the electrode and the workpiece are separated by a spark gap generally from about 0.01 millimeters to about 0.50 millimeters, and are immersed in or flooded by a dielectric fluid. The DC voltage enables a spark discharge charge or transient arc to pass between the tool and the workpiece. Each spark and/or arc produces enough heat to melt or vaporize a small quantity of the workpiece, thereby leaving a tiny pit or crater in the work surface. The cutting pattern of the electrode is usually computer numerically controlled (CNC) whereby servomotors control the relative positions of the electrode and workpiece. The servomotors are controlled using relatively complex and often proprietary control algorithms to control the spark discharge and control gap between the tool & workpiece. By immersing the electrode and the workpiece in the dielectric fluid, a plasma channel can be established between the tool and workpiece to initiate the spark discharge. The dielectric fluid also keeps the machined area cooled and the removes the machining debris. An EDM apparatus typically includes one or more electrodes for conducting electrical discharges between the apparatus and the part.

One drawback to current EDM processes is that it is a relatively slow process, especially when several distinct features need to be machined into a workpiece. This is particularly so in the aircraft engine industry where electrical discharge machining is widely used for machining various features into aircraft engine parts. Because of this as well as for other reasons, EDM is generally used for fine finishing and not for roughing operations where large quantities of material are removed.

High-speed electroerosion processes have been recently developed that uses spark/arc discharges through an electrolytic medium. Although these processes utilize an electrolyte, it is typically much weaker than those electrolytes used in an electrochemical machining (ECM) processes, and the primary material removal mechanism is thermal via spark/arc discharge. The high speed electroerosion process must have relative movement between the tool and workpiece, and this process uses a different control method relative to EDM.

It would be desirable to have an electromachining apparatus and process that efficiently provides both high speed roughing using the high speed electroerosion process and finishing of the workpiece by EDM.

BRIEF SUMMARY

Disclosed herein is an electromachining apparatus and process. In one embodiment, the electromachining apparatus comprises an electrode spindle system comprising a removable electrode spaced apart from a workpiece; a DC power source in electrical communication with the electrode spindle system; and an electrolyte fluid source and a dielectric fluid source in fluid communication with the electrode, wherein the fluid communication to the electrode is of a selected one of the electrolyte fluid and the dielectric fluid is controlled by a valve.

A process for roughing and finishing a workpiece comprises rotating a rotatable electrode spaced apart from a workpiece to define a gap therebetween and flowing an electrolyte fluid into the gap; supplying DC power to the rotatable electrode in an amount effective to roughly electrochemically erode portions of the workpiece; stopping the rotating electrode and the flow of the electrolyte; mounting a non-rotating electrode and flowing a dielectric fluid into the gap and supplying DC power to the non-rotating electrode in an amount effective to finely electroerode portions of the workpiece.

A process for roughing and finishing a workpiece comprises rotating a rotatable electrode spaced apart from a workpiece to define a gap therebetween and flowing an electrolyte fluid into the gap; supplying DC power to the rotatable electrode in an amount effective to roughly electrochemically erode portions of the workpiece; stopping the rotating electrode and the flow of the electrolyte; mounting a non-rotating electrode and flowing a dielectric fluid into the gap and supplying DC power to the non-rotating electrode in an amount effective to finely electroerode portions of the workpiece.

In another embodiment, the process for roughing and finishing a workpiece comprises rotating a first electrode spaced apart from a workpiece to define a first gap therebetween and flowing an electrolyte fluid into the gap; supplying DC power to the first electrode in an amount effective to roughly electrochemically erode portions of the workpiece; stopping the rotating electrode and the flow of the electrolyte; mounting a second electrode spaced apart from the workpiece to define a second gap and flowing a dielectric fluid into the second gap; and pulsing the DC power to the second electrode in an amount effective to finely electroerode portions of the workpiece.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
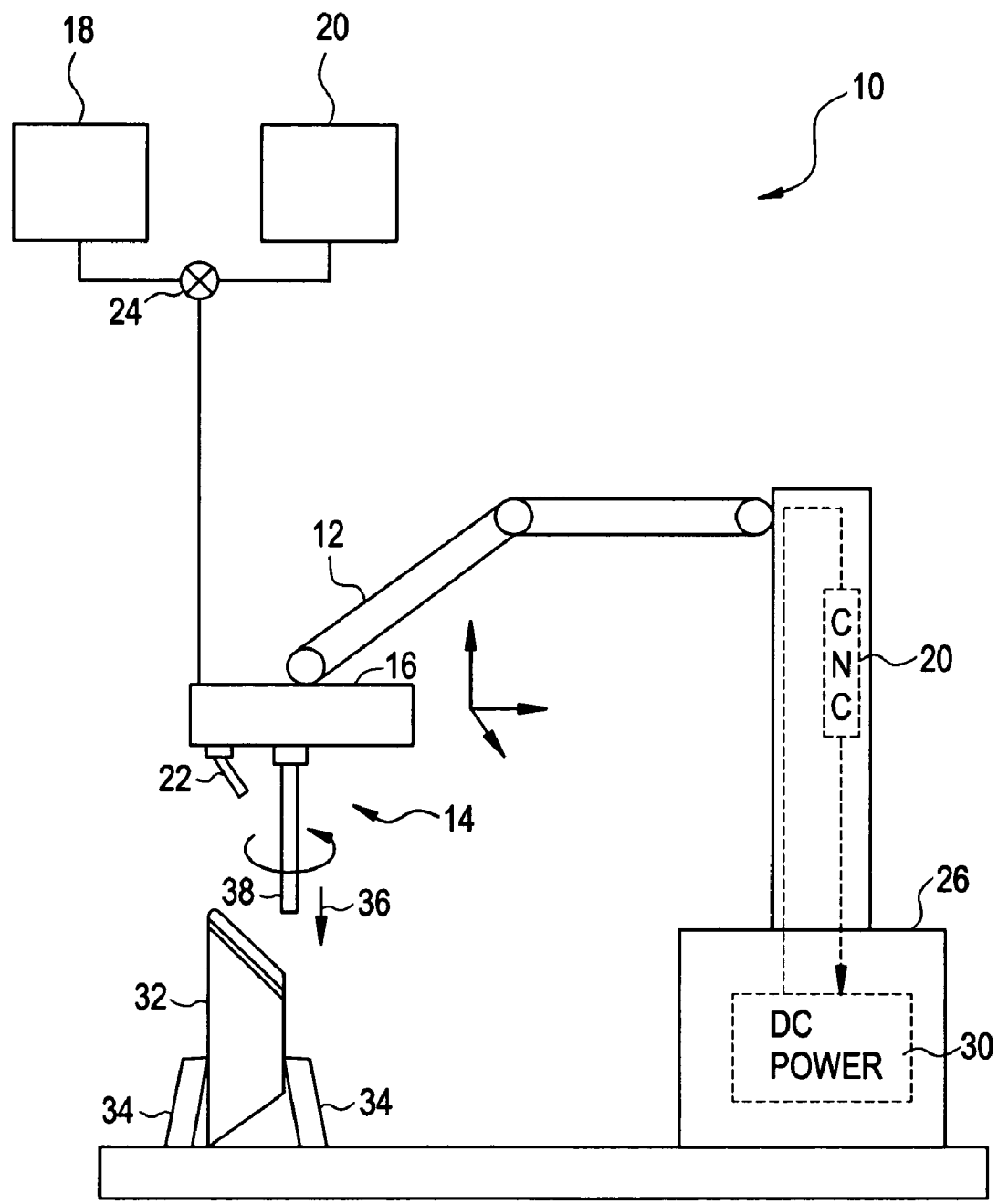
FIG. 1 illustrates a hybrid electromachine for roughing and finishing a part in accordance with an embodiment of the disclosure.

Disclosed herein are electromachining apparatuses and processes that permit rapid prototyping of a workpiece. The apparatuses and processes provide both roughing and finishing operations with the same tool set, thereby providing a significant commercial advantage. Generally, the electromachining apparatus combines both high-speed electroerosion functions and electrodischarge machining (EDM) functions to provide the roughing and finishing operations. During the initial roughing operation, a rotary electrode removably attached to a spindle is rotated and moved about the workpiece. A gap within the electrode allows for the flow of electrolyte. Electrical erosion to the workpiece to provide a near net shape is created by electrical breakdown of the electrolyte and a vapor gas layer produced at the interface between the electrode and the workpiece where material is being removed as well as by instantaneous short circuits or transient arcs between the electrode and the workpiece.

To provide finishing of the roughed workpiece, the apparatus is configured to function in a manner similar to an electrodischarge machine. The rotary electroerosion type electrode used in the high speed electroerosion process is removed and an EDM electrode is attached to the spindle and utilized such that a current flows between the electrode and the part to be finished, i.e., workpiece. In one embodiment, the spindle (and electrode) during the finishing operation would not be rotating and the flow of electrolyte is replaced with a flow of a dielectric fluid. The resulting spark erosion within the dielectric medium provides finishing.

Since non-mechanical means are used to remove and shape the material, low cost tools made of soft metals or any electrically conductive material can be used to significantly lower tooling costs. The workpiece metal removal rate can be increased by intense electrothermal actions, and no significant "cutting forces" are generated so that simple, low rigidity machines can be used that greatly reduce cost. Further, no compensation is necessary for tooling deflection that is common in mechanical milling. As a non-mechanical process, the electro-machining speed is independent of workpiece material hardness and toughness. Higher metal removal speed than milling for tough workpiece metals can be achieved through high intensity electrothermal reactions.

In one embodiment, a multi-axis machine with numerical control on each axis, is used to drive the different electrodes and workpiece movements for machining the workpiece. The electrodes are made of an electrically conductive metal such as brass or other low cost metals. Suitable materials for fabricating the electrode include, but are not limited to, graphite, tungsten copper, tellurium copper, tungsten carbide, brass, pure tungsten, copper, copper alloys, and combinations comprising at least one of the foregoing. The electrode rotates during the high speed electroerosion and is non-rotating during EDM. The electrodes may be any shape (e.g. cylindrical, conical) and size depending on the application. DC power (continuous or pulsed) is used to provide voltage across the tool and workpiece. For the EDM finishing operation, the DC voltage is pulsed. Workpiece metal is roughly and finely removed in a controlled manner by high intensity electro thermal erosion provided by the apparatus.

The control system can regulate tool feed speed and/or pulse intervals to ensure high efficient erosion. Depending on the sensed conditions, tool feed speed can be increased if erosion intensity (as measured by erosion current) is not up to a set level, or it can be maintained at a constant speed when the erosion intensity reaches the set level. Alternatively, the tool feed speed can be reduced if persistent arcing or short-circuiting is detected. Likewise, the control system can provide a suitable voltage required for the particular operation, e.g., the electroerosion roughing with an electrolyte fluid or EDM finishing with a dielectric fluid. The fluids are continuously filtered and can be recycled during use. The apparatus may further include a heat exchanger for removing heat from the fluids during operation.

FIG. 1 shows a schematic representation of an exemplary electromachining apparatus generally designated by reference numeral 10. The electromachining apparatus 10 is depicted as being supported on a robotic type multi-joint motorized arm 12. The motorized arm 12 is configured to move an electrode spindle system 14, which is driven to rotate by a motor unit 16, in a least three mutually opposed directions. The electrode spindle system 14 is selectively supplied an electrolyte fluid or a dielectric fluid from source 18, 20, respectively via a nozzle 20. The fluid source 18, 20 can include a pump or the like for inducing a flow of fluid. Alternatively, an electrode 38 of the electrode spindle system can have a hollow tubular profile in which the fluid is passed therethrough. In another embodiment, the electrode may be manipulated by any multi-axis system such as that which may be used in conventional milling practice. In another embodiment, the workpiece is immersed in the fluid by use of a container (not shown). Optionally, the container further includes a flushing and filtering system. Suitable flushing and filtering systems are disclosed in U.S. patent application Ser. No. 10/708,879 filed on Mar. 20, 2004, incorporated herein by reference in its entirety. Selection of the particular fluid is controlled by valve 24. The fluid sources 18, 20 can be external to the electromachine apparatus as shown or integrated within the machine itself.

The motorized arm 12 is supported on a base 26 which can include a CNC (computerized numerical controller) device 28, which is operatively connected with the motors of the motorized arm 12, and a DC power source 30, which is operatively connected with the electrode spindle system 14. The DC power source can be adapted to provide a continuous voltage or pulsed voltage across the electrode spindle system 14 and a workpiece 32 (The workpiece 32 is not itself a part of the electromachining apparatus 10, but is operable with the workpiece 32.).

The CNC device 28 can be programmed to manipulate the electrode spindle system 14 in a manner which enables the work piece 32 to be shaped via erosion and so that complex shapes such as those of airfoil blades or the like can be quickly and economically produced. Also, the CNC device 28 provides a means to regulate tool feed speed based on the detection of erosion process to avoid persistent arcing or short-circuiting. In this figure, the work piece 32 is schematically depicted as being an airfoil and is shown clamped with clamp members 34 in a position adjacent the base 26.

The electrode 38 is preferably made of electrically conductive material such as graphite and has a shape, which generally mirrors the desired machined shape. The electrode can have a solid or a hollow profile. With the solid profile, the electrolyte or dielectric fluid flow from the nozzle 22. For a hollow profile, the electrolyte or dielectric fluid flow can flow internally through the electrode. Other suitable electrode materials include copper, tungsten copper, tellurium copper, tungsten carbide, brass, pure tungsten, and the like. Selection of the particular ECDM and EDM electrodes as well as the operating parameters will generally depend on the workpiece being machined, which is well within those skilled in the art.

The apparatus may also include a graphical or other display, such as CRT graphical display (not shown) to monitor signals provided by any of the components of the apparatus previously described. Such a graphical or other display may provide diagnostic information to a machine operator to ascertain that each electrode is performing properly, or to fulfill some other diagnostic purpose.

Figure 2:
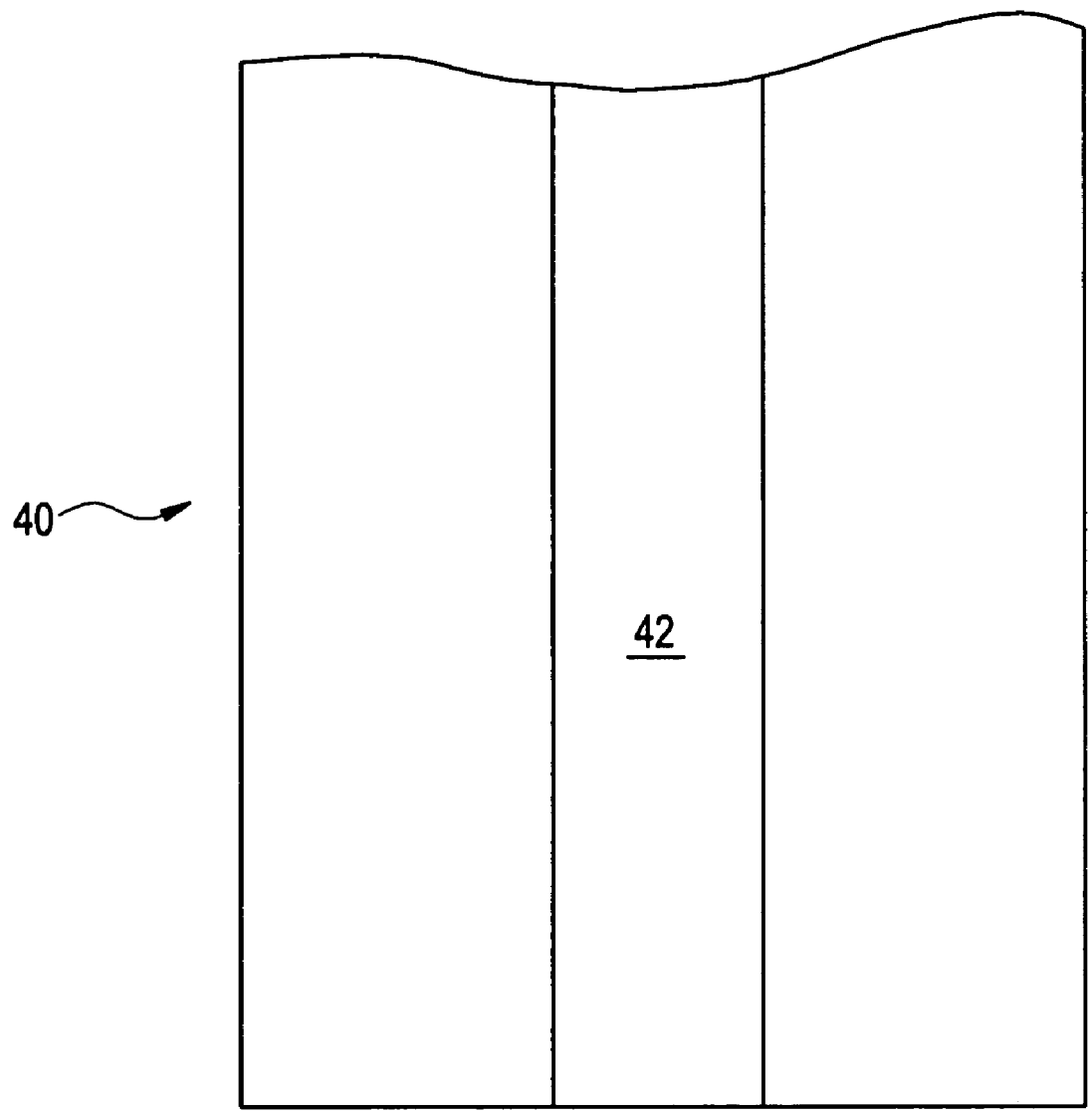
FIG. 2 illustrates an electrode suitable for the electromachining apparatus in accordance with another embodiment.

FIG. 2 illustrates a cross sectional view of a hollow electrode 40. The electrode 40 includes a hollow interior region through which the fluid flows.

During the electroerosion roughing operation, the electrode 38 is in rotative motion relative to the workpiece and is in motion thereabout in order to avoid dwells and excessive arcing. Electrolyte is provided at the gap between the electrode and the workpiece. The electrolyte fluid can be water or an aqueous electrolyte solution, dispersion, or mixture of suitable electrolytic substances/liquids or the like that provides a conductive medium through which an electrical arc can pass. Merely by way of example, solutions of $NaNO_2$, $NaOH$, $NaNO_3$, $Na_2CO_3$, $NaCl$ and mixtures thereof can be used. In one embodiment, the electrolyte is selected to have an electro-conductivity value of 20 microsiemens/cm to 100 millisiemens/cm, wherein the electro-conductivity can be adjusted by salt addition. Optionally, the electrolyte can include other additives, e.g., an anti-rust additive.

During the (EDM) finishing operation, a non-rotating EDM electrode of a suitable shape replaces the electroerosion electrode and the flow of electrolyte is replaced with a flow of the dielectric fluid. The dielectric fluid is a liquid dielectric or mixture of different dielectric fluids. The dielectric fluid is selected to insulate and cool the electrode and workpiece, convey the spark, and flush away the removed metal. Suitable dielectric fluids are non-conductive and include hydrocarbon oils, deionized water, polyolefins, esters, and the like. The rate of advance towards workpiece 32 (in the direction of the arrow 36), termed the electrode feedrate, may be regulated to maintain a predetermined standoff distance between the electrode and the workpiece so that when the electrode is energized with the DC power a plurality of electrical discharges between the electrode and the workpiece performs the machining, i.e., results in spark erosion. Optionally, depending on the part size and desired finish features, either a rotary tool could be used or most likely, a shaped tool that does not rotate would generate the finish machined surfaces.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electromachining apparatus for roughing and finishing a workpiece, the apparatus comprising:
    an electrode spindle system adapted for receiving removable first and second electrodes spaced apart from a workpiece;
    a DC power source in electrical communication with the electrode spindle system;
    an electrolyte fluid source in fluid communication with the first electrode, wherein the electrolyte comprises solely an aqueous solution having an electro-conductivity solely between about 20 micro Siemens/cm and 100 milli Siemens/cm; and
    a dielectric fluid source in fluid communication with the second electrode; wherein the fluid communication is controlled by a valve, wherein the electromachining apparatus is configured to first provide solely an electroerosion roughing operation on the workpiece using primarily a thermal material removal mechanism and is further configured to provide an electrodischarge finishing operation on the workpiece subsequent to the electroerosion roughing operation.

2. The electromachining apparatus of claim 1, wherein the DC power source is a pulsed DC power source.

3. The electromachining apparatus of claim 1, wherein the first and second electrodes are formed of an electrically conductive material.

4. The electromachining apparatus of claim 3, wherein the electrically conductive material is selected from the group consisting of graphite, tungsten copper, tellurium copper, tungsten carbide, brass, pure tungsten, copper, copper alloys, and a combination comprising at least one of the foregoing.

5. The electromachining apparatus of claim 1, wherein the DC power source is a continuous DC power source.

6. The electromachining apparatus of claim 1, further comprising a numerical control device operatively connected to the electrode spindle system to control movement thereof about a plurality of axes.

7. The electromachining apparatus of claim 1, further comprising a servo-control mechanism in operative communication with the power supply and the electrode in fluid communication with the dielectric fluid.

8. The electromachining apparatus of claim 1, wherein the electrolyte is selected from a group consisting of $NaNO_2$, $NaNO_3$, $NaCO_3$, and $NaCl$.

9. The electromachining apparatus of claim 1, wherein the dielectric fluid is selected from the group consisting of a hydrocarbon oil, a water-based synthetic fluid, and deionized water.

10. The electromachining apparatus of claim 1, further comprising a container for containing the workpiece and configured for filtering and recycling the electrolyte fluid and the dielectric fluid.

11. The electromachining apparatus of claim 1, wherein the first electrode is an electroerosion electrode and is configured to rotate and move about the workpiece.

12. The electromachining apparatus of claim 1, wherein the second electrode is an electrodischarge electrode.

13. A method for roughing and finishing a workpiece, the method comprising:
    rotating a rotatable electrode spaced apart from a workpiece to define a gap therebetween and flowing an electrolyte fluid into the gap, wherein the electrolyte comprises an aqueous solution having an electro-conductivity solely between about 20 micro Siemens/cm and 100 milli Siemens/cm;
    supplying DC power to the rotatable electrode in an amount effective to solely roughly erode portions of the workpiece using primarily a thermal material removal mechanism;
    stopping the rotating electrode and the flow of the electrolyte;
    mounting a non-rotating electrode and flowing a dielectric fluid into the gap and supplying DC power to the non-rotating electrode in an amount effective to finely electroerode portions of the workpiece.

14. The method of claim 13, further comprising activating a servo-control when the DC power is pulsed to the non-rotating electrode and the dielectric fluid is flowed.

15. The method of claim 13, wherein supplying the DC power to the non-rotating electrode is pulsed.

16. The method of claim 13, wherein supplying the DC power to the rotating electrode is continuous.

17. The method of claim 13, further comprising flushing the electrolyte fluid from the gap, filtering the flushed electrolyte fluid, and recycling the electrolyte fluid to the rotating electrode.

18. The method of claim 13, further comprising flushing the dielectric fluid from the gap, filtering the flushed dielectric fluid, and recycling the dielectric fluid to the non-rotating electrode.

19. A method for roughing and finishing a workpiece in a single tooling system, the method comprising:

rotating a first electrode spaced apart from a workpiece to define a first gap therebetween and flowing an electrolyte fluid into the gap, wherein the electrolyte comprises solely an aqueous solution having an electro-conductivity solely between about 20 micro Siemens/cm and 100 milli Siemens/cm;

supplying DC power to the first electrode in an amount effective to solely roughly erode portions of the workpiece using primarily a thermal material removal mechanism;

stopping the rotating electrode and the flow of the electrolyte; mounting a second non-rotating electrode spaced apart from the workpiece to define a second gap and flowing a dielectric fluid into the second gap; and pulsing the DC power to the second electrode in an amount effective to finely electroerode portions of the workpiece.

* * * * *